(12) United States Patent
Meyer et al.

(10) Patent No.: US 6,485,656 B1
(45) Date of Patent: Nov. 26, 2002

(54) AGENTS FOR UNSTICKING PAINT, AND SEDIMENTATION AGENTS

(75) Inventors: Arnold Meyer, Michaelisdonn; Jens Juhl, Itzehoe; Klaus Noweck, Brunsbüttel, all of (DE)

(73) Assignee: SASOL Germany GmbH (DE)

( * ) Notice: Subject to any disclaimer, the term of this patent is extended or adjusted under 35 U.S.C. 154(b) by 0 days.

(21) Appl. No.: 09/424,423

(22) PCT Filed: May 26, 1998

(86) PCT No.: PCT/DE98/01476

§ 371 (c)(1),
(2), (4) Date: Feb. 11, 2000

(87) PCT Pub. No.: WO98/54265

PCT Pub. Date: Dec. 3, 1998

(30) Foreign Application Priority Data

May 30, 1997 (DE) .......................................... 197 22 750

(51) Int. Cl.[7] .................................................. C09D 7/00
(52) U.S. Cl. .................. 252/287.17; 106/442; 106/426; 106/467; 106/483; 106/499; 210/930; 210/710; 210/702; 210/723; 516/113

(58) Field of Search .............................. 252/60, 61, 62, 252/62.2, 62.3 R–62.3 ZT, 180; 106/442, 426, 467, 483, 487, 499, 287.17; 516/113; 210/930, 710, 702, 723

(56) References Cited

U.S. PATENT DOCUMENTS

| | | | |
|---|---|---|---|
| 2,928,498 A | | 3/1960 | Schmid-Nisoli et al. ..... 183/115 |
| 4,283,229 A | * | 8/1981 | Girg et al. ................... 106/171 |
| 4,504,395 A | | 3/1985 | Harpel et al. ................ 210/712 |
| 4,564,464 A | | 1/1986 | Harpel et al. ................ 252/181 |
| 4,701,220 A | | 10/1987 | Seng .......................... 106/203 |
| 4,992,199 A | | 2/1991 | Meyer et al. ................ 252/180 |
| 5,550,180 A | * | 8/1996 | Elsik et al. .................. 524/430 |

FOREIGN PATENT DOCUMENTS

| | | |
|---|---|---|
| GB | 1509042 | 4/1978 |
| JP | A-5-92435 | 4/1993 |

* cited by examiner

Primary Examiner—C. Melissa Koslow
(74) Attorney, Agent, or Firm—Browning Bushman P.C.

(57) ABSTRACT

Paint detackifiers and/or sedimentation agents are provided which contain amorphous alumina and/or alumina in pseudoboehmite or boehmite form having an average crystallite size of from 0.1 to 15 nm and/or the hydrates and hydroxyalkylpolysaccharides thereof.

8 Claims, 1 Drawing Sheet

AGENTS FOR UNSTICKING PAINT, AND SEDIMENTATION AGENTS

BACKGROUND OF THE INVENTION

This invention relates to a paint detackifier and sedimentation agent based on nanocrystalline or amorphous aluminas and/or alumina hydrates.

DESCRIPTION OF THE PRIOR ART

When applying lacquers, waxes, or similar coating materials containing organic substances which are not soluble in water, it sometimes happens that not all of the material reaches the intended article to be coated. Especially when painting automobile bodies, oversprayed paint deposits in the paint spray booths. The lacquer or paint mist formed in these booths when spray painting goods, such as automobile bodies, is scrubbed by an air-flow which makes the overspray contact recirculated water or a water curtain, or it is removed by other paint mist wet separators. In order that no tacky paint residues agglomerate in the scrubbing system and plug the mist eliminators, spray heads, and recirculating pumps, detackifiers and sedimentation agents are employed to make the paint particles coagulate in the wash water and precipitate. It is desirable to obtain in a single work cycle a non-tacky and easily removable sludge.

Up to the present, many different additives have been tried as flocculants, detackifiers, or coagulants. For instance, it is known to use inorganic additives containing aluminium, such as aluminium silicates, aluminium sulfates, aluminium chlorides, aluminium oxides, aluminium hydroxides, or montmorillonites. In addition, a large number of organic auxiliaries are known which can be employed alone or in combination with the aforementioned inorganic additives, for example polyacrylamides, polymethacrylates, polyvinyl alcohols, polyalkylene oxides, starch, or cellulose.

The use of montmorillonites or smectite in combination with marble lime hydrate and cellulose as a paint detackifier is disclosed in DE A-34 21 270. U.S. Pat. Nos. 4,564,464 and 4,504,395 disclose detackifiers for high-solids paints which contain bentonite, particularly hectorite, as a main component and are blended for economic reasons with montmorillonite clays or alumina and which also contain the usual additives, such as foam depressants and coagulants.

The disadvantages of all prior art paint detackifiers are their different effects on the different types of lacquers, such as NC, polyacrylate, polyester, or PU lacquers, and waxes. Furthermore, when employed for the widely used high-solids lacquers, said detackifiers are inefficient because quantities of up to 50 wt. %, based on the weight of the sprayed paint, are required to perform the detackification.

DE 38 17 251 (EP 0 342 339) suggests the use of paint detackifiers based on alumina ($Al_2O_3$) of the pseudoboehmite or boehmite type either in the X-ray amorphous form or with 2 to 15 nm size crystallites. It is reported in said patent that much smaller quantities are required in contrast to bentonite-containing detackifiers and that said system can be used as a one-component system or in combination with customary defoamers or polymeric deflocculants. The polymeric deflocculant Praestol 2415 (acrylamide/acrylate copolymer) manufactured by Stockhausen is disclosed in said patent.

SUMMARY OF THE INVENTION

Figure 1:
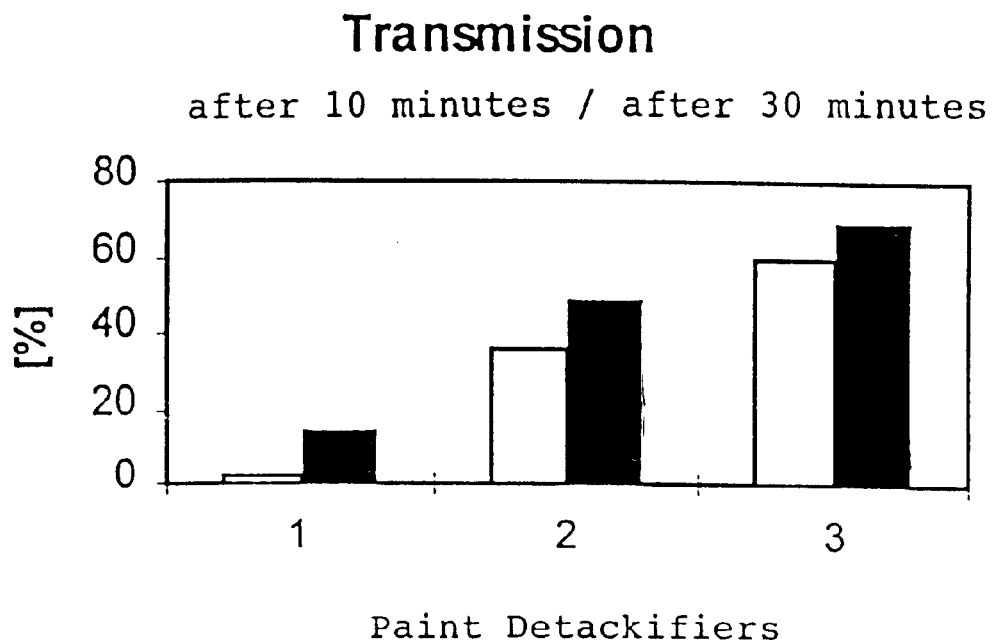
FIG. 1/2 is a bar graph comparing the light transmission of several paint detackifiers.
Figure 2:
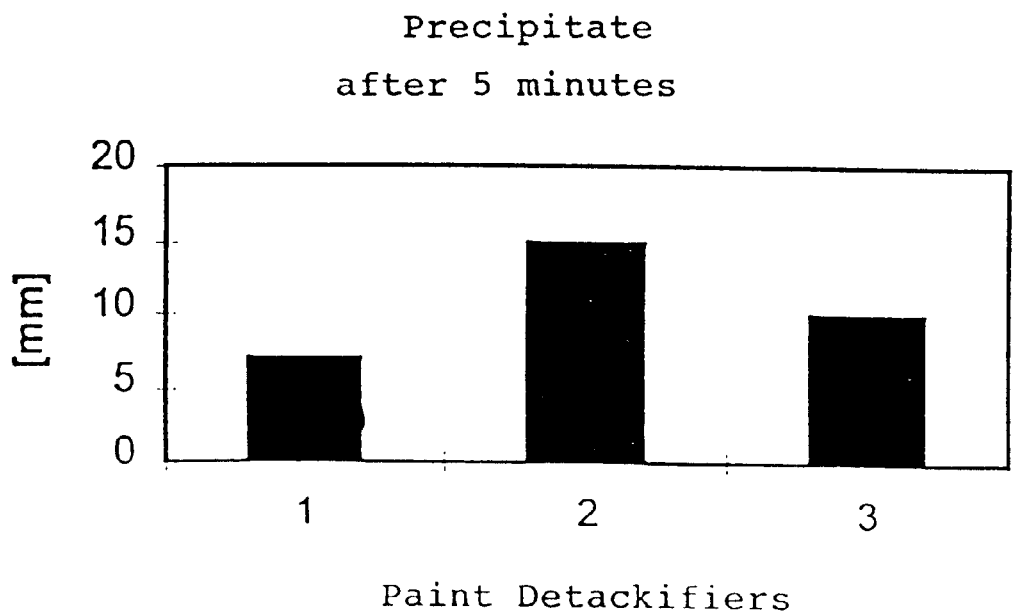
FIG. 2/2 is a bar graph showing the degree of precipitant of various paint detackifiers after a five-minute period.

Accordingly, it was the object of the present invention to provide a novel paint detackifier and sedimentation agent that allows efficient detackification of the lacquers nowadays used particularly in automobile production, that can be easily manufactured, and that is capable of removing the lacquer to be detackified from water in a more efficient and rapid way than hitherto.

According to the instant invention, the problem is solved by providing a composition which contains (a) one or more aluminium compound(s) in the form of amorphous alumina and/or pseudoboehmite- or boehmite-type alumina having an average crystallite size of from 0.1 to 15 nm and/or the hydrates thereof and (b) one or more hydroxyalkyl polysaccharide(s), particularly hydroxyalkyl cellulose, having 0.5 to 6, particularly 2 to 4 hydroxyalkyl groups per ring unit on the average, where the hydroxyalkyl groups, independently of one another, have 2 to 6, particularly 2 to 4 carbon atoms, with the weight ratio ranging from 100:2 to 100:20, based on the ratio of total aluminium (as $Al_2O_3$) to hydroxyalkyl polysaccharide.

DESCRIPTION OF THE PREFERRED EMBODIMENTS

The aforementioned aluminium compounds are dispersible in aqueous solutions. Preferably, the hydroxyalkyl polysaccharide has an average molecular weight of from 20,000 to 800,000, particularly from 30,000 to 120,000 g/mol.

The aluminium compound, as $Al_2O_3$, may contain 1 to 20 wt. % hydrolyzable aluminium salts which may be added to the composition prior to or preferably after the alumina synthesis. Said aluminium salts are compounds that, in contact with water, set free aluminium valences which in turn build up Al—OH or Al—O bonds, while the counter-anion is set free. Examples are $Al(NO_3)_3$, $AlCl_3$, $Al_2(SO_4)_3$, $Al(HCOO)_3$, and $Al(CH_3COO)_3$.

The composition can be employed in the spray booths as a concentrated aqueous solution/emulsion or as a powder, substantially as a dry substance. If said composition contains water, it preferably contains from 2 to 25 wt. %, particularly from 3 to 14 wt. % of the aluminium compound, as $Al_2O_3$, based on the total weight of the aqueous composition. Preferably, the aqueous composition contains from 3 to 30 wt. %, particularly from 6 to 25 wt. % of the composition comprising the aluminium compound and the hydroxyalkyl polysaccharide.

The composition is suitable as a paint detackifier and/or sedimentation agent and is preferably employed at a weight ratio of composition, based on dry mass, to paint in a range of from 0.2:100 to 20:100, particularly from 1:100 to 10:100, i.e. in quantities of from 0.2 to 20 wt. %, particularly from 1 to 10 wt. %, based on the weight of the lacquer to be detackified. The detackifier should expediently be sold and stored in anhydrous or concentrated form. Besides paints or lacquers, other coating materials, such as waxes, corrosion inhibitors, or underseals, can be detackified as well using the aforementioned proportions.

The paint detackifier is suitable for a wide variety of lacquers, paints, or other sprayable coating materials and can be used as a concentrated aqueous emulsion or as a powder, where each component alone or the complete composition can be added to the wash water in the spray booths or to any other paint mist wet separators.

The aluminas or alumina hydrates used are either X-ray amorphous products or pseudoboehmites or boehmites with average crystallite sizes of 0.1 to 15 nm, particularly 0.3 to 15 nm (measured by X-ray diffraction on the 021 reflex). The alumina particles having sizes according to this invention are positively charged and are capable of binding the usually negatively charged lacquer particles and of making them flocculate.

Pseudoboehmite is a crystalline-type alumina presenting the typical boehmite reflexes which, however, are slightly shifted as a result of a larger amount of crystallization water. Boehmite has a d-value of 0.611 nm, whereas pseudoboehmite has a d-value of greater than 0.611 nm, mostly less than 0.64 nm with the hkl reflex of 020.

The aluminas/alumina hydrates of this invention are dispersible in water or acids. The particles formed by dispersion in water preferably have sizes in the range of from 5 to 1,000 nm, particularly from 5 to 500 nm, and most preferably from 5 to 100 nm for a quantity of greater than 90 wt. %. The aluminas/alumina hydrates employed according to this invention may contain water which is bound either crystallographically or physically.

The physical and chemical properties of alumina hydrates largely depend on the conditions of the manufacturing process.

Aluminas/alumina hydrates which are dispersible in water or acids and have been manufactured by aluminium alcoholate hydrolysis in a pH range of from 1 to 11 are particularly preferred.

Several processes for producing the aluminas/alumina hydrates of this invention are described hereinbelow.

In order to produce water-dispersible alumina, preferably $C_2$- to $C_{10}$-aluminium alcoholates are hydrolyzed with water having a pH range of from 1 to 6. The resultant alumina is dispersible in water or dilute acids. The alumina agglomerates thus obtained can optionally be decomposed by dilute acids, such as hydrochloric acid, nitric acid, acetic acid, formic acid, propionic acid, chloroacetic acid, and lactic acid. They may be further decomposed into their primary particles by addition of aluminium salts and/or hydrothermal aging.

Instead of dispersing the resultant aluminas in acid, it is also possible to spray the acids on the alumina agglomerates so that they can be used as directly water-dispersible aluminas. Furthermore, the alumina can be produced by addition of gaseous acids as set forth in DE A-24 08 233. In case electrolyte-free emulsions are to be employed, the hydrolyzed aluminas may also be processed into electrolyte-free emulsions by applying high shearing force, e.g. occurring in colloid mills. Aluminas manufactured by hydrolysis may also be produced after special treatment by precipitation from aluminate and aluminium salts, or by any one of the processes described herein and may additionally contain said aluminium salts which can be added after or during the alumina/alumina hydrate production. Examples of aluminium salts are $Al(NO_3)_3$, $AlCl_1$, $Al_2(SO_4)_3$, $Al(CHCOO)_3$, and $Al(CH_3COO)_3$.

According to DE 24 08 233-C2, acid-dispersible boehmite which is commercially available can be aftertreated, e.g. by exposure to gaseous acids, such as hydrogen chloride or $NO_2$, in a fluidized bed. By addition of water to said powders aftertreated in this way emulsions having high dispersibility are obtained.

According to EP 0 505 896-Al, commercially available alumina hydrates of different crystalline structures (for instance alumina mono- or trihydrtates) are used for producing water-dispersible boehmite. In a dissolving process, the highly crystalline aluminium component reacts with a large quantity of nitric acid at a pH-value of less than 3.5 and elevated pressure and temperature. The resultant boehmite alumina hydrates are crystalline and dispersible in water. Said materials present crystallite sizes of greater than 6 nm (measured on the 021 reflex).

According to the process set forth in DE 43 37 643 (WO 95/12547), water-dispersible, amorphous or nanocrystalline alumina from aluminium trialcoholates or partially substituted aluminium mono- or dialcoholates are converted by hydrolysis and polycondensation at temperatures of from 60° C. to 110° C. in the presence of understoichiometric amounts of monovalent inorganic or organic acids or the anhydrides thereof as polymerization inhibitors to yield nanocrystalline alumina hydrates having an amorphous or a boehmite structure. The polymerization inhibitors can be inorganic acids, particularly hydrochloric acid or HCl gas, nitric acid or $NO_2$ gas, carbonic acid or $CO_2$, or organic acids, particularly formic acid, acetic acid, propionic acid or the anhydrides thereof, or short-chain, monovalent organic acids. Said processes are particularly suitable to reduce crystallinity while simultaneously maintaining or improving the water dispersibility. By incorporation of said polymerization modifiers it is possible to prevent three-dimensional linkage of the Al—OH groups.

An additional amount of acid can be added to the resultant alumina hydrate and, optionally, the aqueous alumina hydrate suspensions can be subjected to hydrothermal post-aging whereby the alumina hydrate particles are stabilized without altering their structures such that the subsequent drying step will prevent aggregation of the primary agglomerates. Formation of larger primary agglomerates will deteriorate the properties spectrum of the composition with respect to paint detackification.

Said process allows to produce in a direct way nanocrystalline boehmite alumina hydrates showing low agglomeration tendency of the primary particles and having a crystallite size of <4.0 nm (measured on the 021 reflex). These alumina hydrates are dispersible in water and yield clear, translucent emulsions. U.S. Pat. Nos. 4,992,199 and 6,030,599 are explicitly incorporated herein by reference.

Hydroxyalkylpolysaccharides are polysaccharide derivatives which are for instance obtained by the reaction of polysaccharide compounds with epoxy compounds, such as ethylene oxide, butylene oxide, or propylene oxide. They may comprise one or more additional hydroxyalkyl group (s), based on one saccharide ring unit. After reaction with one hydroxy group of t hie saccharide ring the hydroxyalkyl group may form an ether bond or an additional ether bond with a hydroxy group of an already incorporated hydroxyalkyl group. Incorporation of the hydroxyalkyl groups usually occurs randomly. Preferably, the hydroxyalkyl groups comprise secondary hydroxyl groups.

The glucopyranoside unit of hydroxypropyl cellulose (CAS name: cellulose 2-hydroxypropylether; CAS-RN 9004-64-2) with three hydroxypropyl groups is given as an example.

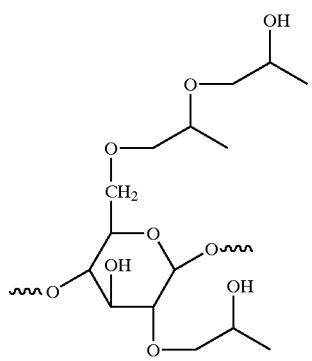

β-D-1,4-glucopyranoside unit of hydroxypropyl cellulose

For instance, suitable hydroxyalkylpolysaccharides have an amylopectine, amylose, dextrane, xanthane, glycogen, or cellulose matrix, the latter one being particularly preferred. The hydroxyalkyl group of the hydroxyalkylpolysaccharides may have 2 to 6, preferably 2 to 4 carbon atoms. Hydroxypropyl cellulose is particularly preferred.

Furthermore, the paint detackifiers of this invention may contain as mentioned hereinabove for example 0 to 10 wt. %, preferably 3 to 6 wt. % acids, such as hydrochloric acid, nitric acid, formic acid, acetic acid, lactic acid, chloroacetic acid, and/or propionic acid, which require as a counterion the equivalent amount of aluminium ions or alumina. Optionally, the paint detackifiers may also contain customary foam depressants or any other polymeric flocculants.

EXAMPLES 500 ml of water and 5 ml of the lacquer to be detackified were placed into a mixing apparatus. After intensive stirring for 5 minutes, 100 ml of the mixture were transferred into a 130-ml polyethylene cylinder provided with a lid. There was added 0.2 ml of paint detackifier emulsion containing 7.5% $Al_2O_3$. The cylinder was placed up-side down into a rotary apparatus where it was rotated for 30 minutes at 60 rpm. The cylinder was removed from the apparatus and the mixture was allowed to rest for 5 minutes, after which time the height of t he detackified lacquer deposit was measured in mm. After 10 and 30 minutes of rest some of the supernatant liquid was pipetted out from the top of the cylinder. The transmission of the supernatant was measured using a photometer (1-cm cuvette, wave length 450 nm). The efficiencies of several paint detackifiers have been compiled in the following tables and are illustrated by the graphs attached hereto.

Paint detackifier compositions (as aqueous solutions) containing

| Paint Detackifier 1 (Comparative Example) | |
| --- | --- |
| Sol P3 Alumina | 7.5 wt. % (as $Al_2O_3$) |
| Paint Detackifier 2 | |
| Sol P3 Alumina | 7 wt. % (as $Al_2O_3$) |
| Aluminium nitrate | 1.05 wt. % (based on the quantity of $Al(NO_3)_3 \times 9 H_2O$ used, which is equal to 0.25 wt. % as $Al_2O_3$) |
| Hydroxypropylcellulose | 0.5 wt. % (Klucel EF) |
| Paint Detackifier 3 | |
| Alumina | 7.5 wt. % (as $Al_2O_3$) |
| Hydroxypropylcellulose | 0.5 wt. % (Klucel EF) |

The Sol P3 alumina manufactured by RWE-DEA AG für Mineraloel und Chemie in accordance with the process set forth in DE 43 37 643 is commercially available. The alumina in paint detackifier 3 was prepared by hydrolysis of 250 g of 6.4 wt. % aluminium hexanolate solution in hexanol at 90° C. in 500 ml of a 2.78% nitric acid. The resultant X-ray amorphous powder contained 50.5 wt. % alumina and 22.7 wt. % nitrate. The aqueous phase was spray dried after phase separation.

Klucel® EF is a proprietary product of Aqualon with an average molecular weight of 80,000 g/mol (determined by size exclusion chromatography (SEC)).

TABLE

| Paint Detackifier | Transmission [%] after | | Precipitate [mm] after |
| --- | --- | --- | --- |
| | 10 minutes | 30 minutes | 5 minutes |
| 1 | 2 | 14 | 7 |
| 2 | 36 | 49 | 15 |
| 3 | 60 | 70 | 10 |

What is claimed is:

1. A composition suitable as a paint detackifier and/or sedimentation agent comprising:
   (a) one or more aluminum compounds comprising amorphous alumina, pseudoboehmite alumina, boehmite alumina, hydrates of said aluminas, and mixtures thereof wherein said pseudoboehmite and boehmite aluminas have an average crystallite size of from 0.1 to 15 nm, measured by X-ray defraction on the 021 reflex; and
   (b) at least one hydroxyalkyl polysaccharide having 0.5 to 6 hydroxyalkyl groups per ring unit on the average, wherein the hydroxyalkyl groups, independently of one another, have 2 to 6 carbon atoms, with a weight ratio ranging from 100:2 to 100:20, based on the ratio of total alumina, calculated as $Al_2O_3$, to hydroxyalkyl polysaccharide.

2. The composition according to claim 1, characterized in that the hydroxyalkyl polysaccharide is hydroxypropyl cellulose.

3. The composition according to claim 1, characterized in that the hydroxyalkyl polysaccharide has an average molecular weight of from 20,000 to 800,000 g/mol.

4. The composition according to claim 1, characterized in that the hydroxyalkyl polysaccharide is a hydroxyalkyl cellulose.

5. The composition according to any one of claims 1–4, characterized in that said composition additionally contains water.

6. The composition according to any one claims 1–4, characterized in that there is also present 1 to 20 wt. %, based on the aluminum compound, calculated as $Al_2O_3$, of a hydrolyzable aluminum salt.

7. The composition according to claim 5, characterized in that said aluminum compound is present in said composition in an amount of from about 2 to 25 wt. % calculated as $Al_2O_3$.

8. The composition according to any one of claim 5 or 7, characterized in that the combined amount of said aluminum compound and said hydroxyalkyl polysaccharide is present in said composition in an amount of 3 to 30 wt. %.

* * * * *